United States Patent
Ho

(12) United States Patent     (10) Patent No.: US 8,072,101 B2
Ho     (45) Date of Patent: Dec. 6, 2011

(54) BASE FOR A HEAT-DISSIPATING FAN MOTOR

(75) Inventor: Sung-Shan Ho, Daya Township (TW)

(73) Assignee: Q In Precision Industries Co., Ltd., Tanzih Township (TW)

( * ) Notice: Subject to any disclaimer, the term of this patent is extended or adjusted under 35 U.S.C. 154(b) by 94 days.

(21) Appl. No.: 12/319,947

(22) Filed: Jan. 13, 2009

(65) Prior Publication Data

US 2009/0230798 A1    Sep. 17, 2009

(30) Foreign Application Priority Data

Mar. 17, 2008 (TW) ................. 97109317 A

(51) Int. Cl.
*H02K 7/00* (2006.01)
*H02K 1/04* (2006.01)
*H02K 5/00* (2006.01)
*H02K 5/16* (2006.01)
*H02K 1/22* (2006.01)

(52) U.S. Cl. ............ 310/67 R; 310/43; 310/89; 310/90; 310/268

(58) Field of Classification Search ............... 310/67 R, 310/68 R; 417/423.14; 415/178
See application file for complete search history.

(56) References Cited

U.S. PATENT DOCUMENTS

| 4,168,423 | A | * | 9/1979 | Gilreath | 219/402 |
| 6,420,805 | B1 | * | 7/2002 | Yamaguchi et al. | 310/67 R |
| 7,001,149 | B1 | * | 2/2006 | Waggoner et al. | 415/204 |
| 2005/0058543 | A1 | * | 3/2005 | Takeshita et al. | 415/206 |
| 2006/0012032 | A1 | * | 1/2006 | Paulus et al. | 257/706 |
| 2007/0003419 | A1 | * | 1/2007 | Wu et al. | 417/363 |

FOREIGN PATENT DOCUMENTS

| JP | 08021396 A | * | 1/1996 |
| JP | 08023656 A | * | 1/1996 |

OTHER PUBLICATIONS

Machine Translation JP08021396 (1996), JP08023656 (1996).*

* cited by examiner

*Primary Examiner* — Quyen Leung
*Assistant Examiner* — Jose Gonzalez Quinones
(74) *Attorney, Agent, or Firm* — Kilpatrick Townsend & Stockton LLP

(57) ABSTRACT

A base for a heat-dissipating fan motor includes a plate member made of metal, a coupling barrel made of plastic, and an outer case made of plastic. The plate member is formed with at least one positioning leg and at least one air inlet hole. The plate member has a motor-confronting side, and the positioning leg extends inclinedly and protrudes from the motor-confronting side. The coupling barrel is adapted for coupling with the heat-dissipating fan motor, and has a closed-barrel end that has the positioning leg embedded therein, and an open-barrel end opposite to the closed barrel end. The outer case is connected to the plate member, cooperates with the coupling barrel to form a motor-receiving space, and is formed with an air outlet hole.

12 Claims, 6 Drawing Sheets

BASE FOR A HEAT-DISSIPATING FAN MOTOR

CROSS-REFERENCE TO RELATED APPLICATION

This application claims priority to Taiwanese Application No. 097109317, filed Mar. 17, 2008, the disclosure of which is incorporated herein by reference.

BACKGROUND OF THE INVENTION

1. Field of the Invention

This invention relates to a base for a motor, more particularly to a base for a heat-dissipating fan motor used in portable electronic devices.

2. Description of the Related Art

Referring to FIGS. 1 and 2, a conventional base 6 for a heat-dissipating fan motor 6 used in portable electronic devices, such as a notebook computer, includes an outer case 61 made of plastic and formed by injection molding, and a coupling barrel 62 made of metal, riveted to the outer case 61, and adapted for coupling with the heat-dissipating fan motor. The outer case 61 includes a base plate 611 riveted to the coupling barrel 62 and formed with a plurality of air inlet holes 612, and a case body 613 which extends integrally from the base plate 611 and which cooperates with the base plate 611 to define an air outlet holes 610. The coupling barrel 62 is shaped using a lathe (not shown).

Some of the disadvantages of the conventional base 6 for a heat-dissipating fan motor are as follows:

1. Because the coupling barrel 62 and the outer case 61 are interconnected by riveting, connection between the coupling barrel 62 and the outer case 61 is prone to loosen after a period of use.

2. Since a lathe is required to machine the coupling barrel 62, the manufacturing cost of the base 6 is relatively high.

3. In order for the base plate 611 of the outer case 61 to have sufficient strength, the thickness of the base plate 611 must be at least 1.2 millimeters, thereby resulting in a relatively large volume of the base 6, which in turn results in a corresponding increase in the volume of the portable electronic device that incorporates the base 6 for a heat-dissipating fan motor.

SUMMARY OF THE INVENTION

Therefore, the object of the present invention is to provide a base for a heat-dissipating fan motor that can overcome at least one of the above drawbacks of the prior art.

According to this invention, a base for a heat-dissipating fan motor includes a plate member made of metal, a coupling barrel made of plastic, and an outer case made of plastic. The plate member is formed with at least one positioning leg and at least one air inlet hole. The plate member has a motor-confronting side, and the positioning leg extends inclinedly and protrudes from the motor-confronting side. The coupling barrel is adapted for coupling with the heat-dissipating fan motor, and has a closed-barrel end that has the at least one positioning leg embedded therein, and an open-barrel end opposite to the closed barrel end. The outer case is connected to the plate member, cooperates with the coupling barrel to form a motor-receiving space, and is formed with an air outlet hole.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
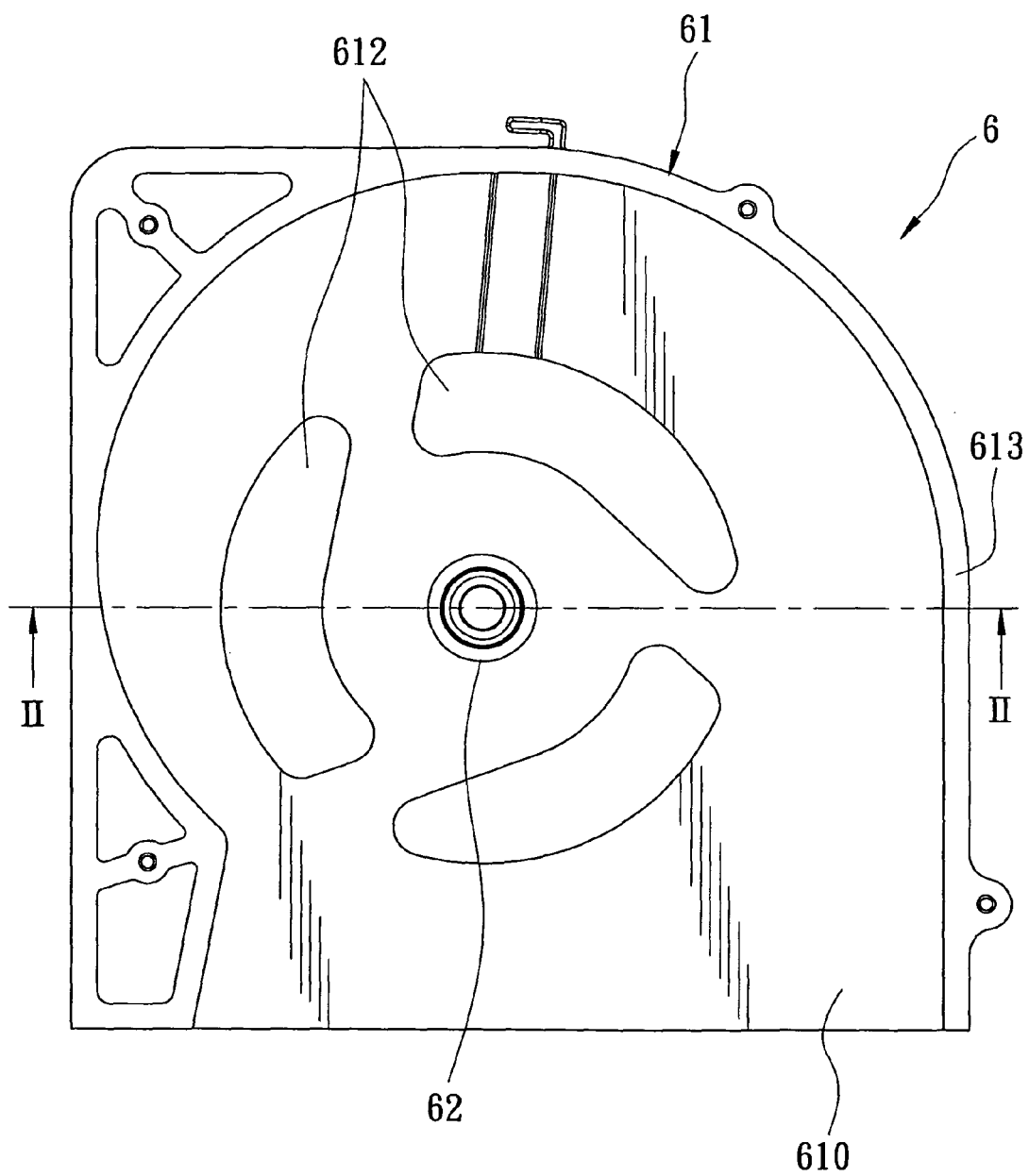
FIG. 1 is a top view of a conventional base for a heat-dissipating fan motor.
Figure 2:
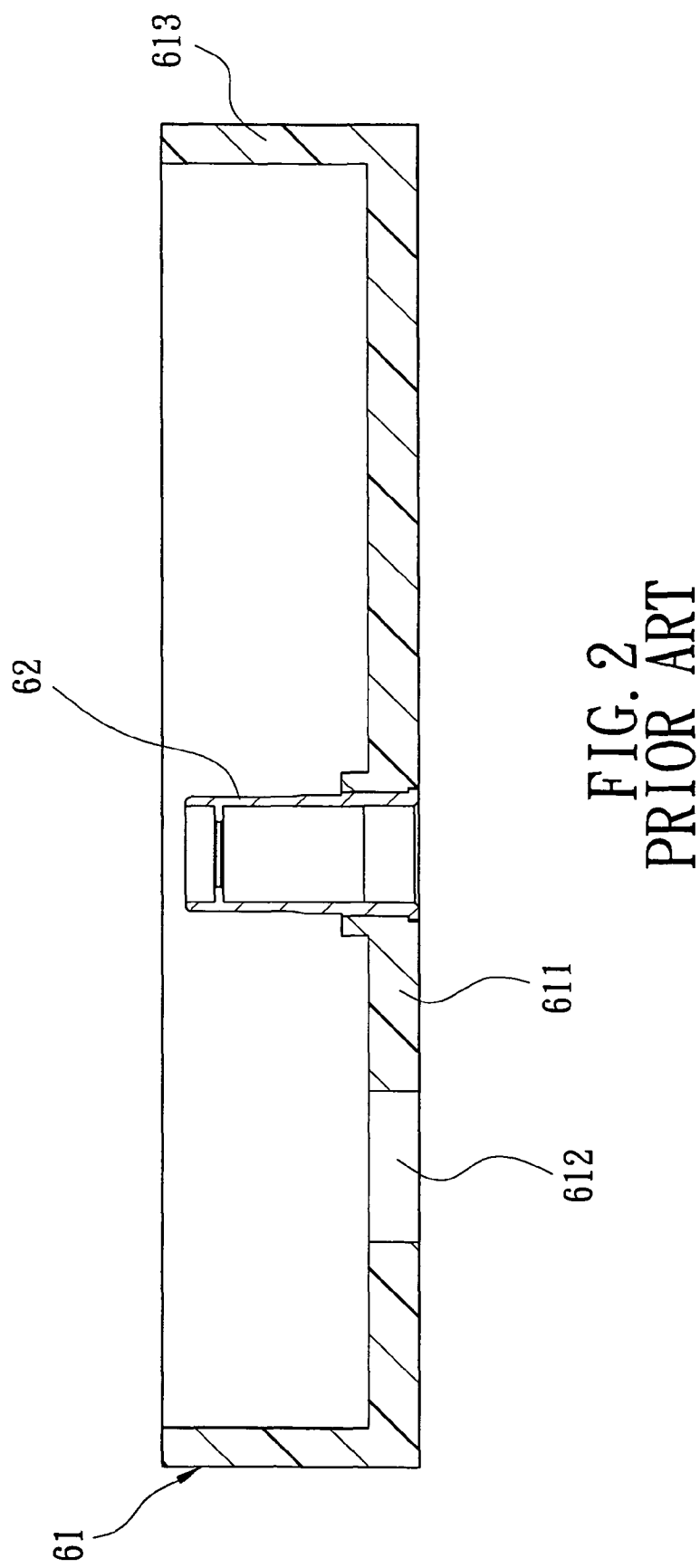
FIG. 2 is a sectional view of the conventional base taken along line II-II in FIG. 1.
Figure 3:
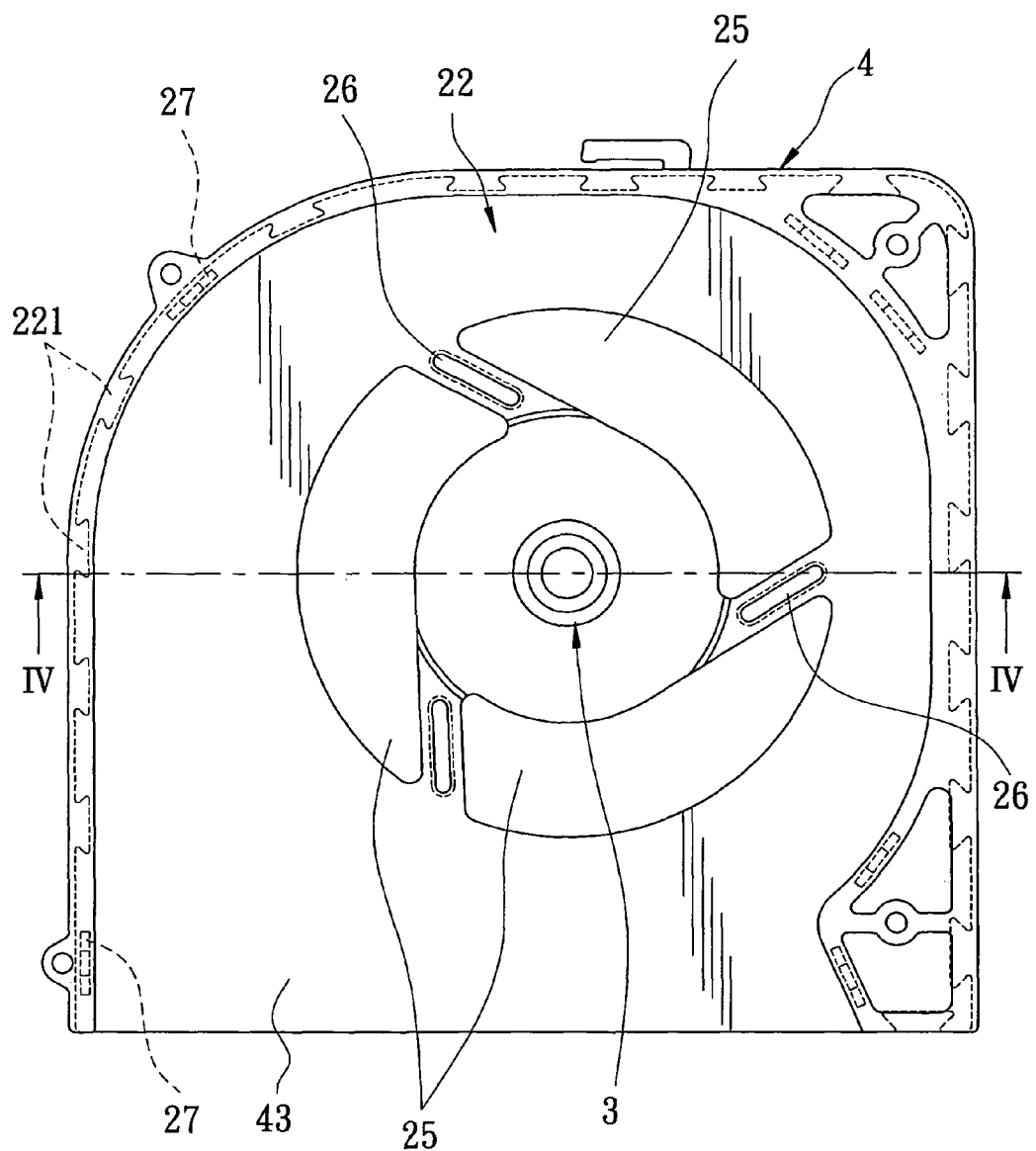
FIG. 3 is a top view of the preferred embodiment of a base for a heat-dissipating fan motor according to this invention.
Figure 4:
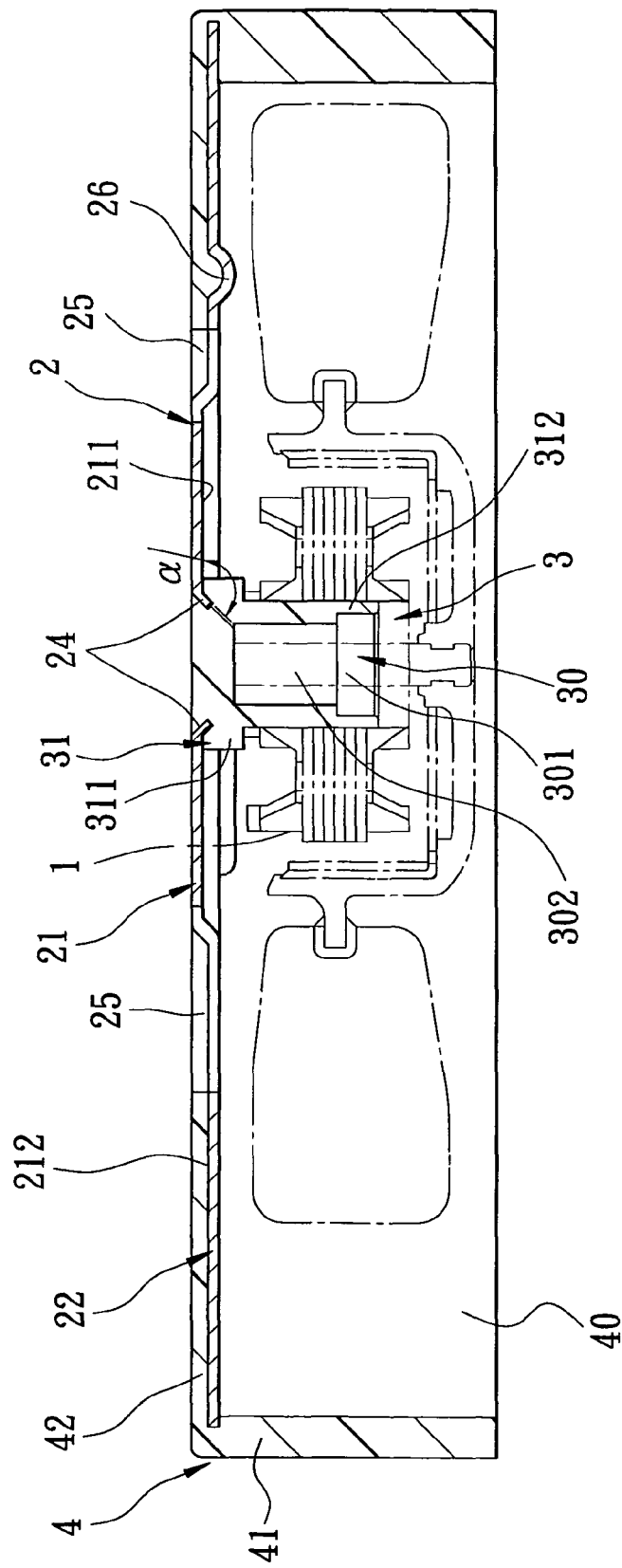
FIG. 4 is a sectional view of the preferred embodiment taken along line IV-IV in FIG. 3.
Figure 5:
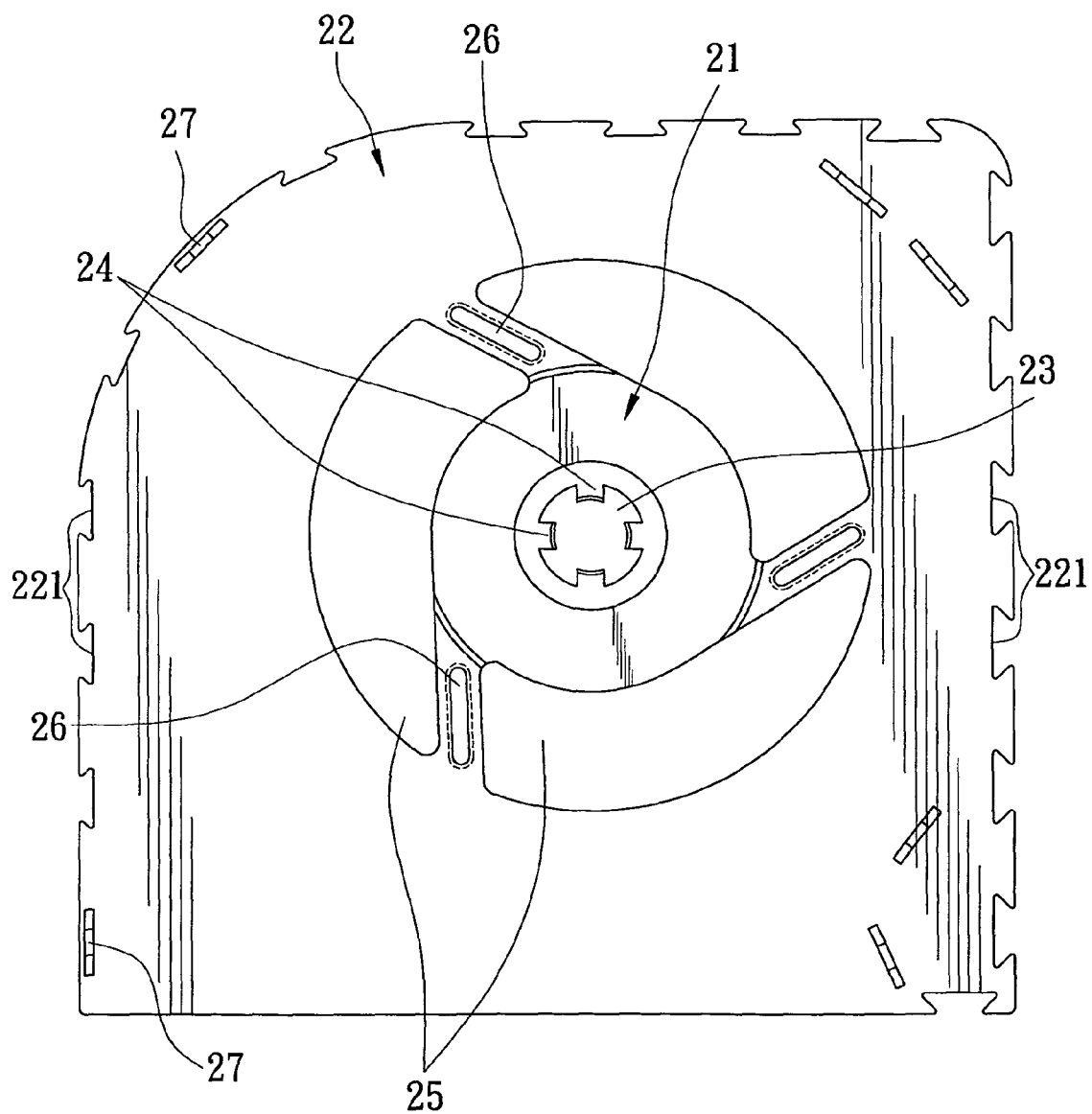
FIG. 5 is a top view of a plate member of the preferred embodiment.

Referring to FIGS. 3, 4, and 5, the preferred embodiment of a base according to the present invention is suitable for a heat-dissipating fan motor 1, and is shown to include a plate member 2 made of metal, a coupling barrel 3 made of plastic, and an outer case 4 made of plastic.

Figure 6:
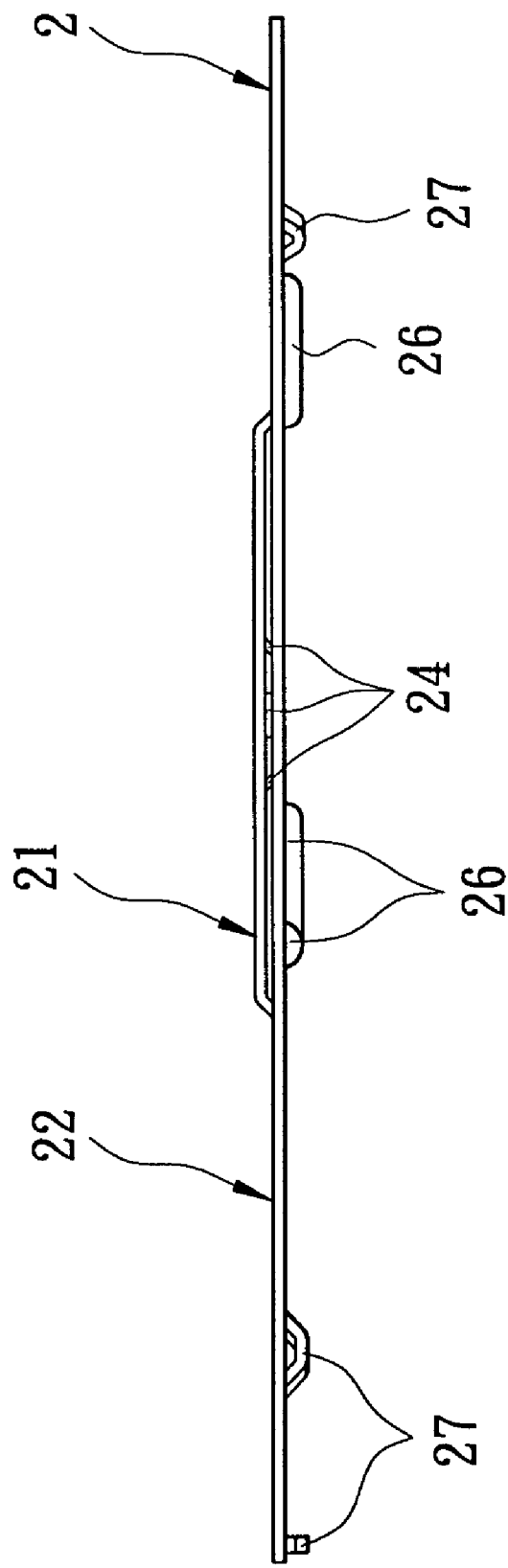
FIG. 6 is a schematic side view of the plate member.

The plate member 2 is formed by stamping, has a motor-confronting side 211 that confronts the heat-dissipating fan motor 1, and includes a planar portion 22 and a protruding portion 21 that is surrounded by the planar portion 22 and that projects relative to the planar portion 22 in a direction away from the motor-confronting side 211. The protruding portion 21 is formed with a through-hole 23, and a plurality of positioning legs 24 that extend inclinedly from a periphery of the through-hole 23 and that protrude from the motor-confronting side 211. In this embodiment, there are four positioning legs 24 that are equiangularly spaced apart from each other. Preferably, each positioning leg 24 forms an angle $\alpha$ that ranges from 95 degrees to 175 degrees relative to the motor-confronting side 211 of the protruding portion 21. In this preferred embodiment, each positioning leg 24 forms an angle $\alpha$ that is 135 degrees relative to the motor confronting side of the protruding portion 21. Since the number of the positioning legs 24 can vary to suit a desired coupling strength between the plate member 2 and the coupling barrel 3, one, two or three positioning legs 24 can be used in other embodiments of the invention. The planar portion 22 is formed with a plurality of air inlet holes 25 that surround the protruding portion 21, and a plurality of ribs 26 each of which is elongated, projects from the motor-confronting side 211, and is disposed between an adjacent pair of the air inlet holes 25. The ribs 26 serve to reinforce connections between the planar portion 22 and the protruding portion 21 to resist deformation. The planar portion 22 is further formed with a plurality of arch-shaped projecting ears 27 that project from the motor-confronting side 211. The arch-shaped projecting ears 27 can be solid or hollow, and serve to increase contact area between the plate member 2 and the outer case 4, thereby enhancing structural connection between the outer case 4 and the plate member 2. The arch-shaped projecting ears 27 are hollow in this embodiment, as best shown in FIG. 6.

The coupling barrel 3 is formed by injection molding, is adapted for coupling with the heat-dissipating fan motor 1, and includes a barrel wall 31 defining an installation hole 30 and having a closed-barrel end 311 and an open-barrel end 312. The closed-barrel end 311 has the positioning legs 24 of the plate member 2 embedded therein. The installation hole 30 has a large-diameter section 301 at the open-barrel end 312 and a small-diameter section 302 at the closed-barrel end 311. The small-diameter section 302 is in spatial communication with the large-diameter section 301, and has a diameter smaller than that of the large-diameter section 301.

The outer case 4 is connected to the plate member 2 and cooperates with the coupling barrel 3 to form a motor-receiving space 40 for receiving the heat-dissipating fan motor 1. The outer case 4 includes a case body 41 that has the engaging structures 221 and the arch-shaped projecting ears 27 embedded therein and that is formed with an air outlet hole 43, and a cover body 42 that extends integrally from the case body 41 and that covers one side 212 of the planar potion 22 opposite to the motor-confronting side 211 without blocking the air-inlet holes 25.

Some of the advantages of the base for a heat-dissipating fan motor 1 according to this invention are as follows:

1. Embedding engagement of the positioning legs 24 with the closed-barrel end 311 of the coupling barrel 3 results in a stronger connection compared to the riveting connection between the outer case 61 and the coupling barrel 62 in the prior art.

2. The plate member 2 is formed by stamping, whereas the coupling barrel 3 and the outer case 4 are formed by injection molding. Compared to the prior art where the outer case 61 and the coupling barrel 62 are produced by injection molding and lathe machining, respectively, the manufacturing cost of the base of this invention is lower.

3. Due to the arrangement of the cover body 42 that covers the side 212 of the planar potion 22 of the plate member 2, the combined thickness of the cover body 42 and the planar portion 22 can be less than 1.2 millimeters while achieving sufficient strength. The minimum combined thickness of the planar portion 22 and the cover body 42 can be as small as 0.4 millimeter, thereby effectively reducing the volume of the base for a heat-dissipating fan motor 1 according to this invention.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A base for a heat-dissipating fan motor, comprising:
    a plate member made of metal and formed with at least one positioning leg and at least one air inlet hole, said plate member having a motor-confronting side, said positioning leg extending inclinedly and protruding from said motor-confronting side, said plate member including a planar portion and a protruding portion that is surrounded by said planar portion and that projects relative to said planar portion in a direction away from said motor-confronting side;
    a coupling barrel made of plastic, adapted for coupling with the heat-dissipating fan motor, and having a closed-barrel end that has said at least one positioning leg embedded therein, and an open-barrel end that is opposite to said closed-barrel end; and
    an outer case made of plastic, connected to said plate member, cooperating with said coupling barrel to form a motor-receiving space, and formed with an air outlet hole, said outer case including a case body and a cover body that extends integrally from said case body and that covers one side of said planar portion opposite to said motor-confronting side so as to reinforce said planar portion.

2. The base for a heat-dissipating fan motor as claimed in claim 1, wherein said plate member is further formed with a through-hole, and said positioning leg extends inclinedly from a periphery of said through-hole.

3. The base for a heat-dissipating fan motor as claimed in claim 1, wherein said plate member is formed with a plurality of said positioning legs and is further formed with a through-hole, said positioning legs extending inclinedly from a periphery of said through-hole.

4. The base for a heat-dissipating fan motor as claimed in claim 3, wherein said positioning legs are equiangularly spaced apart from each other.

5. The base for a heat-dissipating fan motor as claimed in claim 2, wherein said positioning leg and said through-hole are provided at said protruding portion.

6. The base for a heat-dissipating fan motor as claimed in claim 5, wherein said positioning leg forms an angle that ranges from 95 degrees to 175 degrees relative to said motor-confronting side of said protruding portion.

7. The base for a heat-dissipating fan motor as claimed in claim 1, wherein said planar portion has an outer periphery formed with a plurality of engaging structures, said case body of said outer case having said engaging structures embedded therein and being formed with said air outlet hole.

8. The base for a heat-dissipating fan motor as claimed in claim 7, wherein each of said engaging structures is a dovetail groove structure.

9. The base for a heat-dissipating fan motor as claimed in claim 7, wherein said plate member is formed with a plurality of arch-shaped projecting ears that are embedded in said case body.

10. The base for a heat-dissipating fan motor as claimed in claim 1, wherein said coupling barrel includes a barrel wall defining an installation hole and having said closed-barrel end and said open-barrel end, said installation hole having a large-diameter section at said open-barrel end, and a small-diameter section at said closed-barrel end, said small-diameter section being in spatial communication with said large-diameter section and having a diameter smaller than that of said large-diameter section.

11. The base for a heat-dissipating fan motor as claimed in claim 1, wherein said plate member is formed with a plurality of said air inlet holes and is further formed with at least one rib that projects from said motor-confronting side and that is disposed between an adjacent pair of said air inlet holes.

12. A base for a heat-dissipating fan motor, comprising:
    a plate member made of metal and formed with at least one positioning leg and at least one air inlet hole, said plate member having a motor-confronting side, said positioning leg extending inclinedly and protruding from said motor-confronting side, said plate member including a planar portion and a protruding portion that is surrounded by said planar portion and that projects relative to said planar portion in a direction away from said motor-confronting side, said planar portion having an outer periphery that is formed with a plurality of engaging structures, each of said engaging structures being a dovetail groove structure, said plate member being formed with a plurality of arch-shaped projecting ears;
    a coupling barrel made of plastic, adapted for coupling with the heat-dissipating fan motor, and having a closed-barrel end that has said at least one positioning leg embedded therein, and an open-barrel end that is opposite to said closed-barrel end; and
    an outer case made of plastic, connected to said plate member, cooperating with said coupling barrel to form a motor-receiving space, and formed with an air outlet hole, said outer case including a case body, and a cover body that extends integrally from said case body and that covers one side of said planar portion opposite to said motor-confronting side so as to reinforce said planar portion, said case body having said engaging structures of said outer periphery of said planar portion embedded therein and being formed with said air outlet hole, said case body having said arch-shaped projecting ears of said plate member embedded therein.

* * * * *